(12) United States Patent
Park et al.

(10) Patent No.: US 9,225,463 B2
(45) Date of Patent: Dec. 29, 2015

(54) METHOD AND APPARATUS FOR CANCELLING INTERFERENCE

(71) Applicant: LG ELECTRONICS INC., Seoul (KR)

(72) Inventors: Hanjun Park, Seoul (KR); Kijun Kim, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/596,142

(22) Filed: Jan. 13, 2015

(65) Prior Publication Data

US 2015/0201421 A1 Jul. 16, 2015

Related U.S. Application Data

(60) Provisional application No. 61/927,456, filed on Jan. 14, 2014.

(51) Int. Cl.
*H04L 1/00* (2006.01)
*H04W 72/08* (2009.01)

(52) U.S. Cl.
CPC .............. *H04L 1/00* (2013.01); *H04W 72/082* (2013.01)

(58) Field of Classification Search
CPC .......... H04W 72/082; H04W 72/1231; H04W 72/085; H04W 28/048; H04W 40/16; H04L 1/00; H04L 5/006; H04B 17/345; H04J 11/0023
See application file for complete search history.

(56) References Cited

U.S. PATENT DOCUMENTS

2013/0157705 A1* 6/2013 Kwon ................. H04J 11/0026
                                                    455/501
2014/0092882 A1* 4/2014 Sankar ................. H04L 5/0007
                                                    370/336

* cited by examiner

*Primary Examiner* — Curtis Odom
(74) *Attorney, Agent, or Firm* — Lee, Hong, Degerman, Kang & Waimey

(57) ABSTRACT

A method for cancelling interference performed by a terminal in a wireless communication system is disclosed. The method includes transmitting an interference information request and Interference Cancellation (IC) scheme information to a serving Base Station (BS), receiving from the serving BS interference information determined according to the interference information request and the IC scheme information, and cancelling interference using the interference information. The IC scheme information may be transmitted when the terminal is to transmit the interference information request and an Interference to Noise power Ratio (INR) exceeds a threshold.

20 Claims, 7 Drawing Sheets

METHOD AND APPARATUS FOR CANCELLING INTERFERENCE

Pursuant to 35 U.S.C. §119(e), this application claims the benefit of U.S. Provisional Patent Application Ser. No. 61/927,456, filed on Jan. 14, 2014, the contents of which are hereby incorporated by reference herein in its entirety.

BACKGROUND OF THE INVENTION

1. Field of the Invention

The present invention relates to a wireless communication system, and more particularly, to a method and apparatus for cancelling interference.

2. Discussion of the Related Art

Recently, various devices requiring machine-to-machine (M2M) communication and high data transfer rate, such as smartphones or tablet personal computers (PCs), have appeared and come into widespread use. This has rapidly increased the quantity of data which needs to be processed in a cellular network. In order to satisfy such rapidly increasing data throughput, recently, carrier aggregation (CA) technology which efficiently uses more frequency bands, cognitive ratio technology, multiple antenna (MIMO) technology for increasing data capacity in a restricted frequency, multiple-base-station cooperative technology, etc. have been highlighted. In addition, communication environments have evolved such that the density of accessible nodes is increased in the vicinity of a user equipment (UE). Here, the node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which a plurality of nodes communicates with a user equipment (UE) using the same time-frequency resources has much higher data throughput than legacy communication scheme in which each node operates as an independent base station (BS) to communicate with the UE without cooperation.

A multi-node system performs coordinated communication using a plurality of nodes, each of which operates as a base station or an access point, an antenna, an antenna group, a remote radio head (RRH), and a remote radio unit (RRU). Unlike the conventional centralized antenna system in which antennas are concentrated at a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-node system can be considered as a kind of Multiple Input Multiple Output (MIMO) system since dispersed nodes can communicate with a single UE or multiple UEs by simultaneously transmitting/receiving different data streams. However, since the multi-node system transmits signals using the dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to decrease in pathloss and enable rapid data transmission in the multi-node system. This can improve transmission capacity and power efficiency of a cellular system and meet communication performance having relatively uniform quality regardless of UE locations in a cell. Further, the multi-node system reduces signal loss generated during transmission since base station(s) or base station controller(s) connected to a plurality of nodes transmit/receive data in cooperation with each other. When nodes spaced apart by over a predetermined distance perform coordinated communication with a UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces the conventional centralized antenna system to become a new foundation of cellular communication in order to reduce base station cost and backhaul network maintenance cost while extending service coverage and improving channel capacity and SINR in next-generation mobile communication systems.

SUMMARY OF THE INVENTION

Accordingly, the present invention is directed to a method and apparatus for cancelling interference that substantially obviate one or more problems due to limitations and disadvantages of the related art.

An object of the present invention is to provide a method for requesting information for interference cancellation and cancelling interference using the requested information.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for cancelling interference, performed by a terminal in a wireless communication system includes transmitting an interference information request and Interference Cancellation (IC) scheme information to a serving Base Station (BS), receiving from the serving BS interference information determined according to the interference information request and the IC scheme information, and cancelling interference using the interference information. The IC scheme information may be transmitted when the terminal is to transmit the interference information request and an Interference to Noise power Ratio (INR) exceeds a threshold.

Additionally or alternatively, the IC scheme information may include information about a type of an IC scheme performed by the terminal or IC target information indicating a target for the IC scheme.

Additionally or alternatively, the IC target information may include an Identifier (ID) of at least one interference BS being a target for the IC scheme, information about a frequency resource region associated with the ID of the at least one interference BS, an INR measured in the frequency resource region, or information about the number of interference BSs being targets for the IC scheme.

Additionally or alternatively, the ID of the at least one interference BS may be acquired using a reference signal received in a specific frequency resource region of interference measurement resources configured for the terminal.

Additionally or alternatively, the reference signal may have a sequence generated using PCI+$N_{(PCI,\ layer\ index)}$+$n_{PCI,s}$ as a seed value, where PCI may be the ID of the interference BS, $N_{(PCI,\ layer\ index)}$ may be a value preset according to the PCI and the layer index, and $n_{PCI,s}$ may indicate a slot or subframe number configured for the PCI.

Additionally or alternatively, the method may further include receiving information about a duration of the interference information from the serving BS.

In another aspect of the present invention, a method for cancelling interference, performed by a BS in a wireless communication system includes receiving an interference information request and IC scheme information from at least one served terminal, transmitting the interference information request to at least one interference BS based on the IC scheme information, receiving interference information from the at least one interference BS, and transmitting the interference information to the at least one served terminal. The IC scheme information may be received when the at least one served terminal is to transmit the interference information request and an INR exceeds a threshold.

Additionally or alternatively, the at least one interference BS may be a BS that interferes with the at least one served terminal, determined using the IC scheme information from among neighbor BSs of the BS.

Additionally or alternatively, the method may further include reallocating frequency resources for the at least one served terminal to adjust an interference level of the at least one served terminal based on the IC scheme information received from the at least one served terminal.

Additionally or alternatively, the transmission of the interference information request may include determining interference information required according to a type of an IC scheme supported by the at least one served terminal and transmitting a request for the determined interference information to the at least one interference BS.

Additionally or alternatively, the transmission of the interference information request may include, if the number of served terminals having transmitted the interference information request for a specific interference BS exceeds a threshold, transmitting the interference information request to the specific interference BS.

Additionally or alternatively, the method may further include transmitting to the at least one interference BS information about the number of interference information requests received by the BS, for each type of IC schemes supported by the at least one served terminal.

Additionally or alternatively, the IC scheme information may include information about a type of an IC scheme performed by the at least one terminal or IC target information indicating a target for the IC scheme.

Additionally or alternatively, the IC target information may include an ID of at least one interference BS being a target for the IC scheme, information about a frequency resource region associated with the ID of the at least one interference BS, an INR measured in the frequency resource region, or information about the number of interference BSs being targets for the IC scheme.

Additionally or alternatively, the ID of the at least one interference BS may be acquired using a reference signal received in a specific frequency resource region of interference measurement resources configured for the at least one terminal.

Additionally or alternatively, the reference signal may have a sequence generated using PCI+$N_{(PCI,\ layer\ index)}$+$n_{PCI,s}$ as a seed value, where PCI may be the ID of the interference BS, $N_{(PCI,\ layer\ index)}$ may be a value preset according to the PCI and the layer index, and $n_{PCI,s}$ may indicate a slot or subframe number configured for the PCI.

Additionally or alternatively, the method may further include receiving information about a duration of the interference information from the at least one interference BS.

Additionally or alternatively, the method may further include receiving, from the at least one interference BS, information indicating whether the interference BS provides the interference information.

In another aspect of the present invention, a terminal configured to perform interference cancellation in a wireless communication system includes a Radio Frequency (RF) unit; and a processor configured to control the RF unit, wherein the processor is configured to transmit an interference information request and Interference Cancellation (IC) scheme information to a serving Base Station (BS); receive, from the serving BS, interference information determined according to the interference information request and the IC scheme information; and perform interference cancellation using the interference information, wherein the IC scheme information is transmitted when the terminal is to transmit the interference information request and an Interference to Noise power Ratio (INR) exceeds a threshold.

In another aspect of the present invention, a base station (BS) configured to perform interference cancellation in a wireless communication system includes a Radio Frequency (RF) unit; and a processor configured to control the RF unit, wherein the processor is configured to receive an interference information request and Interference Cancellation (IC) scheme information from at least one served terminal; transmit the interference information request to at least one interference BS based on the IC scheme information; receive interference information from the at least one interference BS; and transmit the interference information to the at least one served terminal, wherein the IC scheme information is received when the at least one served terminal is to transmit the interference information request and an Interference to Noise power Ratio (INR) exceeds a threshold.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
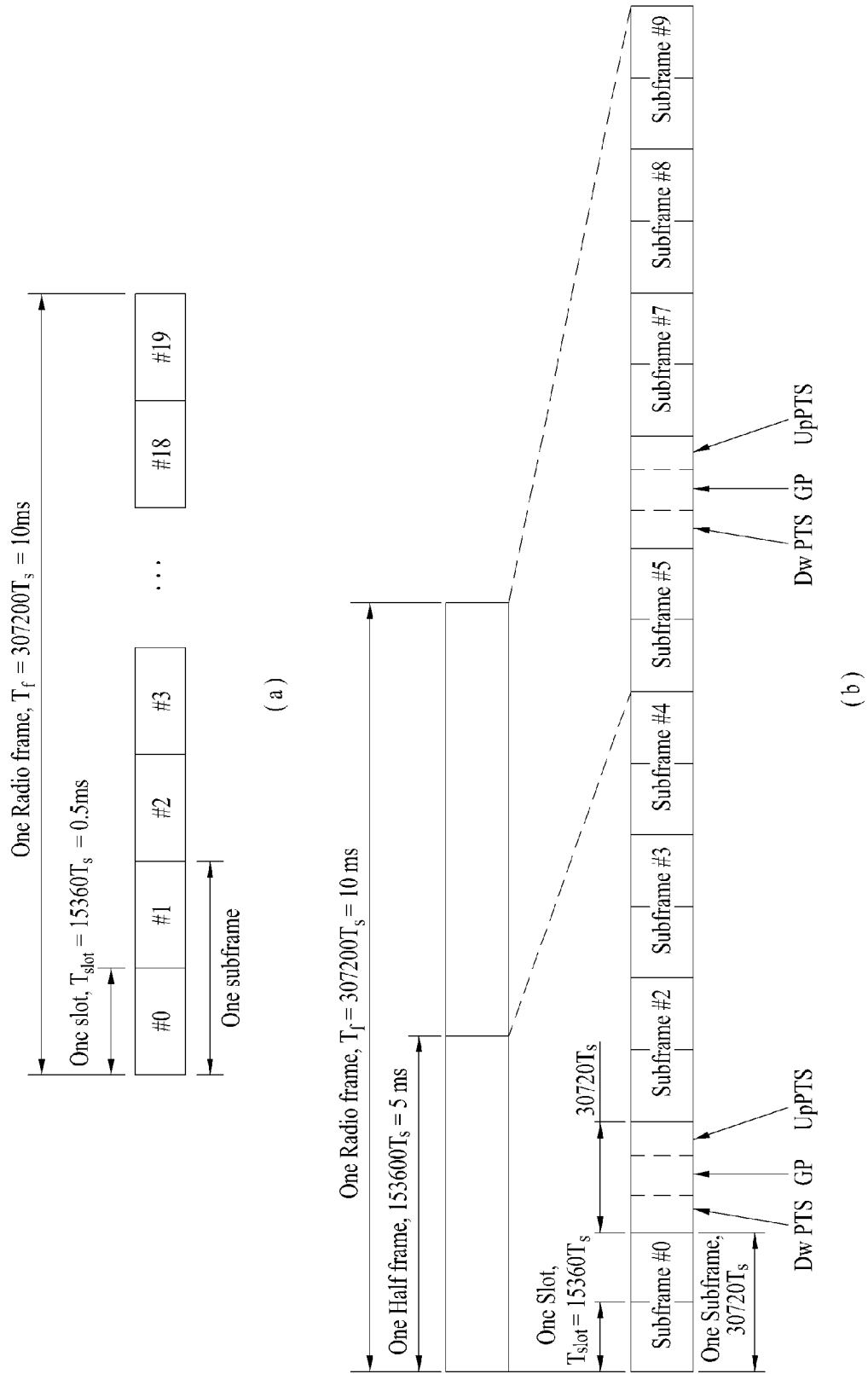
FIG. 1 illustrates an exemplary radio frame structure in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g. macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming) DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowlegement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |

TABLE 2-continued

| | Normal cyclic prefix in downlink | | | Extended cyclic prefix in downlink | | |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| --- | --- | --- | --- | --- | --- | --- |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

Figure 2:
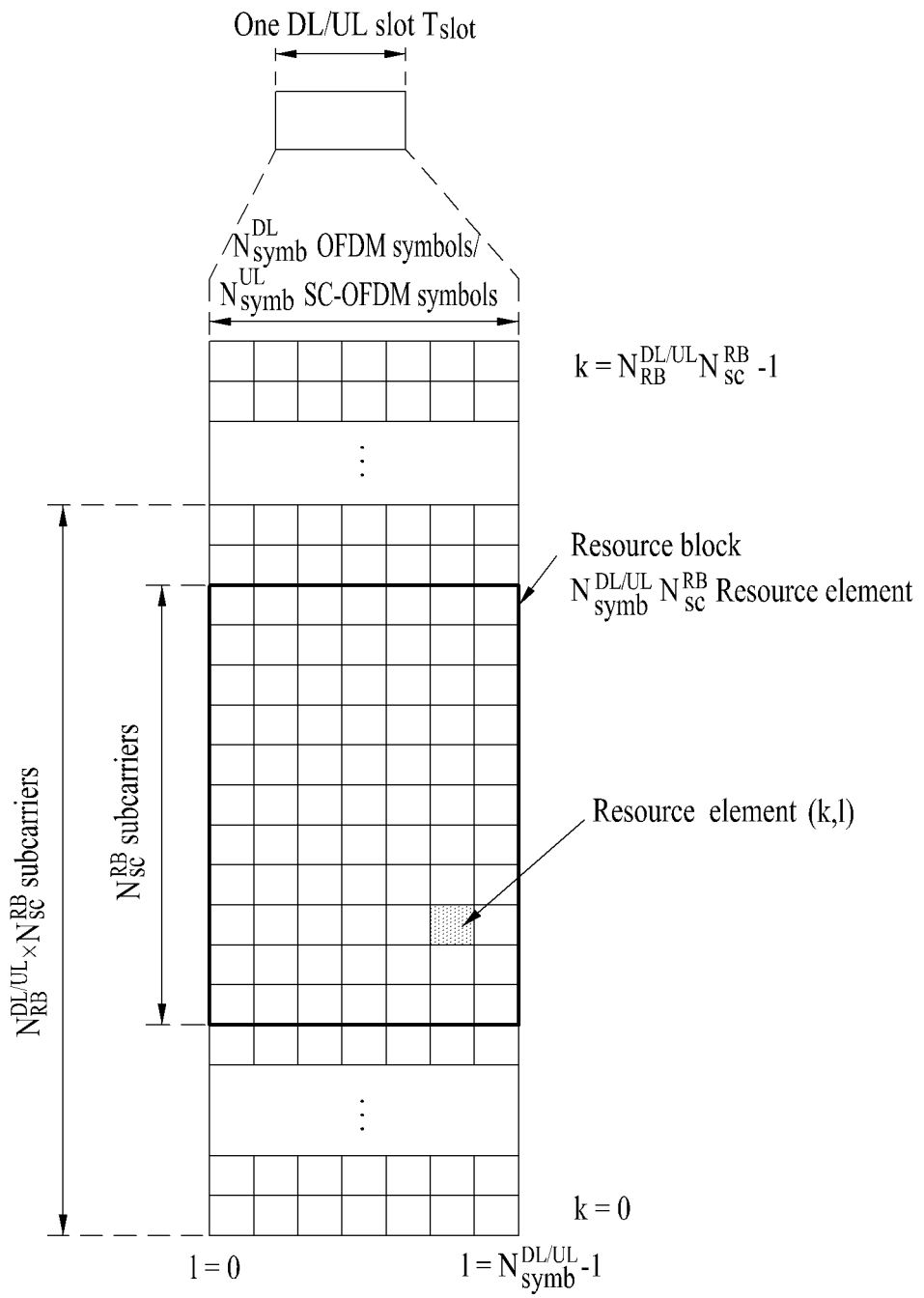
FIG. 2 illustrates an exemplary Downlink/Uplink (DL/UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g. 7) consecutive OFDM symbols in the time domain and $N_{sc}^{RB}$, (e.g. 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, 1) in a slot. Here, k is an index in the range of 0 to $N_{symb}^{DL/UL} * N_{sc}^{RB} - 1$ in the frequency domain and 1 is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL} - 1$, and $N_{VRB}^{DL} = N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
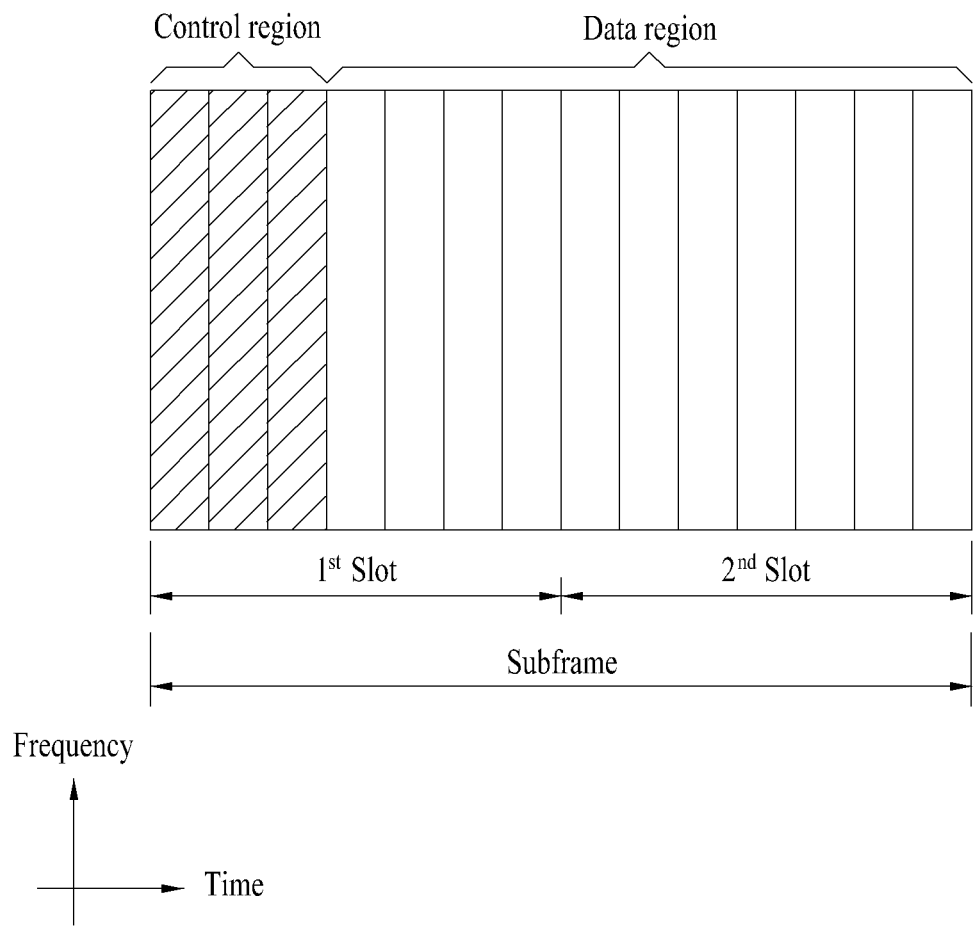
FIG. 3 illustrates an exemplary DL subframe structure in a $3^{rd}$ Generation Partnership Project Long Term Evolution/Long Term Evolution-Advanced (3GPP LTE/LTE-A) system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| Type | Search Space Aggregation Level L | Size [in CCEs] | Number of PDCCH candidates $M^{(L)}$ |
| --- | --- | --- | --- |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g. frequency position) of "B" and transmission format information (e.g. transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
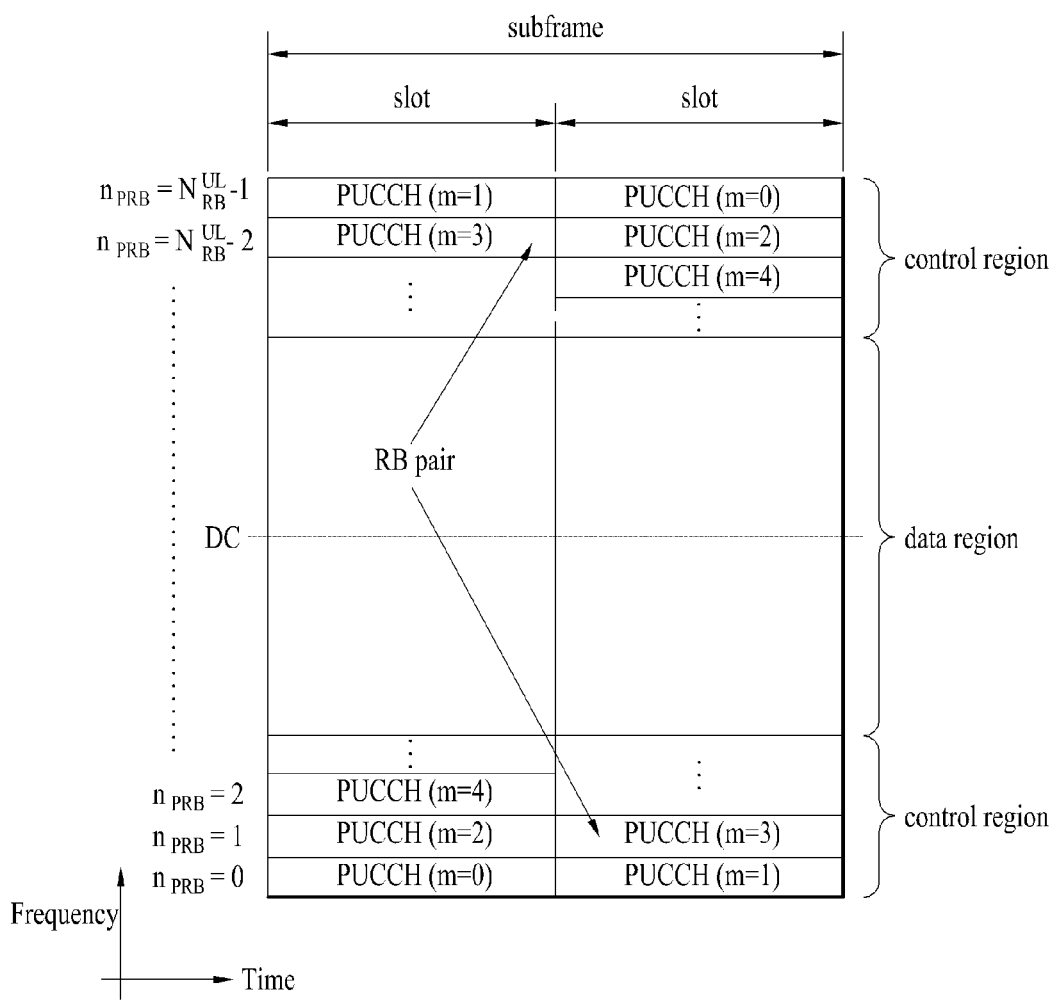
FIG. 4 illustrates an exemplary UL subframe structure in the 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon. Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
| --- | --- | --- | --- | --- |
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

Figure 5:
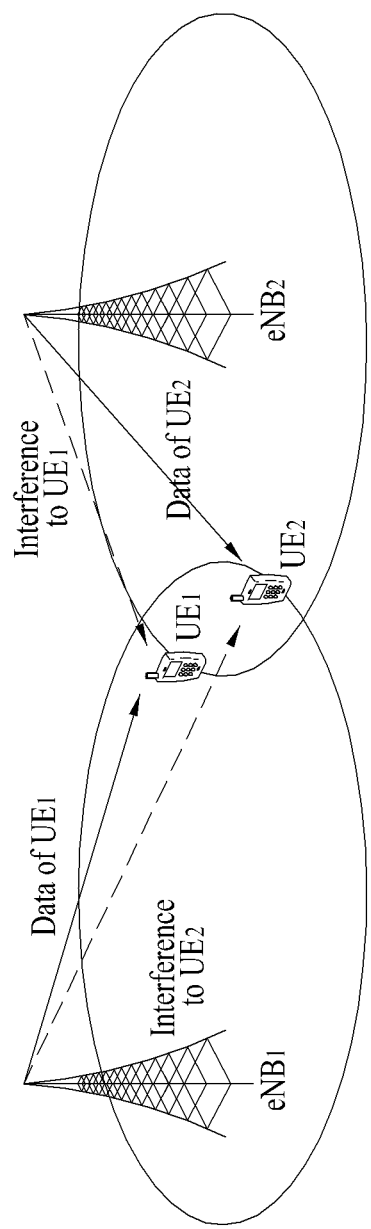
FIG. 5 illustrates an interference environment in a multi-cellular environment.

In an advanced wireless communication system conforming to LTE Rel-12 or the like, a Network Assisted Interference Cancellation (NAIC) scheme is under consideration, in which a UE cancels interference from a neighbor cell with assistance of a network. FIG. 5 illustrates an interference environment in an LTE system, in which when there are $UE_1$ receiving a service from $eNB_1$ and $UE_2$ receiving a service from $eNB_2$, data transmitted from $eNB_1$ to $UE_1$ interferes with $UE_2$ and data transmitted from $eNB_2$ to $UE_2$ interferes with $UE_1$ at the same time. In the case where $UE_1$ or $UE_2$ performs the NAIC scheme in FIG. 5, if the UE succeeds in removing interference data from a received signal by attempting to demodulate or decode data received from a neighbor eNB, the UE may mitigate the effects of interference.

In regard to the NACI scheme in the LTE Rel-12 wireless communication system, Symbol Level Interference Cancellation (SLIC) is under discussion as a significant IC scheme performed by a UE. In SLIC, regarding an interference signal from a neighbor cell, the UE detects a channel that the interference signal experiences and interference data transmitted in the form of a complex number in each resource under the assumption of a specific modulation scheme (e.g., QPSK, 8PSK, 16QAM, etc.) and removes the interference data. Thus, SLIC is a neighbor cell cancellation scheme based on demodulation. Although SLIC is more or less inferior in performance to the IC scheme that removes interference data after decoding, SLIC is advantageous in terms of implementation in that less complexity is imposed on a UE. That's why it is expected that UEs equipped with an advanced receiver will support the SLIC scheme.

To demodulate interference data received from a neighbor cell, a UE supporting an IC scheme such as SLIC should determine a transmission scheme in which the interference data is transmitted. For example, the UE performing SLIC should determine a configuration of an interference data region using the same channel and modulation scheme in a region in which its data is transmitted. Then, the UE should estimate an interference channel that the interference data has experienced in the interference data region to which the same channel and coding scheme is applied. In a system such as an LTE system or the like, there are a Cell-specific Reference Signal (CRS)-based Transmission Mode (TM) and a Demodulation Reference Signal (DM-RS)-based TM. Therefore, the UE should determine a TM used for the interference data. After making the determination on the TM, the UE should determine the number of layers, an RS sequence, and the number of RS ports in order to perform actual interference channel estimation. Upon completion of the interference channel estimation, the UE should determine a modulation scheme (e.g., QPSK, 8PSK, 16QAM, or 64QAM) used for the interference data and the positions of REs carrying the interference data.

As described above, the UE should determine a plurality of parameters related to the TM of the interference data during performing the SLIC scheme. Although the UE may make the determination only with blind detection without assistance of the network, the UE may not achieve an expected performance gain by detecting wrong parameters and performing the IC scheme based on the wrong parameters depending on implementation of the UE.

Accordingly, a method for, when a UE performs an IC scheme, transmitting Network Assistance (NA) signaling including information about interference data to the UE and thus helping the IC scheme of the UE by the network is discussed for the NAIC scheme under discussion in the LTE Rel-12 system. Specifically, semi-static parameters including a TM, a cell ID of an interference eNB, a Multicast Broadcast Single Frequency Network (MBSFN) configuration, the number of CRS antenna ports, transmission power information (e.g., $P_A$ and $P_B$), etc., dynamic parameters including a Control Format Indicator (CFI), a Precoding Matrix Indicator (PMI), a Rank Indicator (RI), a Modulation and Coding Scheme (MCS), the number of DM-RS ports, resource allocation, a DM-RS sequence, etc., and deployment parameters including synchronization, Cyclic Prefix (CP), subframe/slot alignment, etc. are considered as information related to interference data.

The above information about interference data may be provided to a UE performing the NAIC scheme by coordinating a semi-static TM through a plurality of semi-static signals and transmitting the coordination result by semi-static signaling such as RRC signaling or the like by neighbor eNBs. Or an eNB servicing data to the UE performing the NAIC scheme or a neighbor eNB may transmit the information about interference data to the UE by a plurality of dynamic signals having different structures. However, the coordination between eNBs by semi-static signaling may restrict resource allocation, a modulation scheme, the number of layers, etc. and may also limit a scheduling operation of each eNB. On the other hand, the dynamic signaling for interference data may cause interference to DCI for legacy data scheduling and may impose an additional control signaling load on each eNB. Therefore, it may be efficient to support NA signaling only when the NAIC scheme is performed and there is a UE that wants to use NA signaling in performing the NAIC scheme, rather than NA signaling is always transmitted.

Therefore, the present invention provides a method for transmitting an NA signaling request for a specific eNB to a serving eNB transmitting data to a UE by the UE and transmitting the NA signaling request to the specific eNB indicated by the UE through a backhaul by the serving eNB. Then, the specific eNB determines whether to support NA signaling and responds to the serving eNB accordingly. The serving eNB may indicate to the UE whether the specific eNB supports NA signaling. If the specific eNB supports NA signaling, the specific eNB may transmit NA signaling to the serving eNB and the serving eNB may transmit the NA signaling to the UE. The UE may perform IC using the NA signaling.

First, the serving eNB may set a specific interval for the UE performing the NAIC scheme and the UE may selectively report information about the IC scheme in an event-triggered manner. When an Interference to Noise power Ratio (INR) is larger than a predetermined threshold and an NA signaling request is generated, it may be defined that an event is triggered. The information about the IC scheme may include information about the type of the IC scheme (e.g., SLIC, ML, or codeword level-IC) that the UE performs, information about a Physical Cell Identifier (PCI) of an interference eNB on which the IC scheme will be performed, and information about the number of interference eNBs for interference cancellation. After collecting information about the IC scheme, the serving eNB may request support of NA signaling to the interference eNB indicated by the PCI information, or may transmit statistic information specifying the number of requests for support of NA signaling per IC scheme to the interference cell and wait until the interference cell determines support of NA signaling. While an operation principle according to the embodiment of the present invention will be described below in the context of an LTE system, the present invention is applicable to any wireless communication system in which a network may transmit NA signaling supporting an IC scheme and a UE may use the NA signaling.

According to an embodiment of the present invention, a serving eNB may set a specific interval for a UE performing an IC scheme (hereinbelow, referred to as a NAIC UE) and the NAIC UE may request NA signaling to the serving eNB at a time point based on the interval. The NA signaling may be requested by higher-layer signaling. When the network is to support NA signaling selectively, it will be preferred for efficient NA signaling that the NAIC UE is allowed to request NA signaling to an interference cell for the purpose of improvement of blind detection accuracy and mitigation of blind detection complexity during performing the IC scheme. However, the NA signaling request is a signal to be transmitted to an interference eNB connected to the serving eNB by a Non-Ideal Backhaul (NIB). Since an NIB-caused backhaul delay already occurs, it is preferred in terms of reporting effectiveness to generate the NA signaling request of the UE semi-statically.

A criterion for requesting NA signaling by the NAIC UE is whether the NAIC UE currently acquires a large gain by the IC scheme and whether the NAIC UE mitigates complexity by the NA signaling. If the NAIC UE is the only entity responsible for requesting NA signaling, the NAIC UE may always request NA signaling for the selfish purpose of reducing its complexity in spite of an actual resulting small gain, which is not preferable because of the resulting generation of unnecessary network load. Or if the network is the only entity responsible for requesting NA signaling, the network may request NA signaling to an interference cell using only an RSRP report of the NAIC UE. If there are two interference cells (e.g., $eNB_2$ and $eNB_3$) in a resource region of the NAIC UE, the network may request NA signaling to the interference cell having a higher RSRP value despite the absence of an actual traffic load, which is inefficient.

Therefore, the present invention provides a method for controlling generation of a signaling request in an event-triggered manner and, for example, when a ratio (e.g., INR) of the power of interference not cancelled by an IC scheme to interference that a NAIC UE intends to cancel by the IC scheme exceeds a threshold set by a serving eNB and the NAIC UE wants to request NA signaling, reporting information about the IC scheme to the serving eNB.

Reporting information about an IC scheme will be described below in detail.

In an embodiment of the present invention, a CRS-based TM and a DM-RS-based TM are defined in the LTE system. If interference data is transmitted in the DM-RS-based TM, a NAIC UE may receive information about DM-RS sequences used in interference eNBs from a serving eNB and may determine a frequency resource region with which a specific interference eNB interferes by detecting a DM-RS sequence corresponding to the specific interference eNB. On the other hand, if interference data is transmitted in the CRS-based TM, since CRSs are always transmitted across a total system band irrespective of allocation of frequency resources to the interference data, the NAIC UE has difficulty in determining a frequency resource region in which data is transmitted in the CRS-based TM.

Therefore, according to an embodiment of the present invention, CSI-IM resources may be configured for a NAIC UE and interference eNBs may transmit interference RS sequences with their PCIs as seed values in frequency resource region (e.g., RBs) in which the interference cells want to transmit data in the CSI-IMS resources, in order to enable the NAIC UE to readily detect information about frequency resources in which a specific interference cell transmits interference data. The NAIC UE may detect information about an interference cell causes interference due to traffic load and a frequency resource region having the traffic load based on interference information transmitted in the CSI-IM resources, that is, an interference RS sequence. The NAIC UE may report the detected information as IC scheme information to the serving eNB.

Herein, an interference RS sequence may represent one or more layers and is transmitted according to the same precoding as applied to actual data. A seed value applied to an interference RS sequence for each layer may be identified by ($PCI+N_{(PCI,\ layer\ index)}+n_{PCI,s}$. $N_{(PCI,\ layer\ index)}$, is a value preset for each PCI according to a layer index by the network and $n_{PCI,s}$ is a slot number or subframe number for each PCI.

According to another embodiment of the present invention, the NAIC UE may detect the PCI of an interference cell causing severe interference in each frequency resource region by DM-RS sequence detection. If a DM-RS sequence is not detected in a frequency resource region, the NAIC UE may report Overhead Indicator (OI) information about the frequency resource region to the serving eNB.

The interference RS sequence may cause additional overhead to a data resource region. Therefore, an interference cell may selectively transmit an interference RS sequence. If an interference RS sequence is not transmitted, the NAIC UE may receive information about DM-RS sequences used by interference eNBs from the serving eNB and may determine a frequency resource region in which a specific interference cell causes interference by detecting the DM-RS sequence of the specific interference eNB. If the magnitude of interference in a specific frequency resource region is equal to or larger than a predetermined value despite non-detection of a DM-RS sequence in the frequency resource region, the NAIC UE may report to the serving eNB by OI information that CRS-based interference data may exist in the frequency resource region.

The serving eNB may determine a potential interference eNB for the frequency resource region and request NA signaling to the potential interference eNB. If the UE determines that the interference is equal to or larger than the threshold, the NAIC UE may set the OI information to 1 and otherwise, the NAIC UE may set the OI to 0. The NAIC UE may report JO information for each frequency resource (e.g., PRB) to the serving eNB.

According to another embodiment of the present invention, the NIAC UE may report information (e.g., PCIs, INRs, etc.) of interference eNBs having traffic load in respective frequency resource regions as reporting information about an IC scheme. When the IC scheme is performed, it will be preferable in terms of efficiency to trigger semi-static coordination requesting for NAIC or dynamic signaling requesting of interference data information for the IC, that is, NA signaling requesting to an interference eNB, only when needed.

For example, the NAIC UE may report to the serving eNB PCI information about N interference eNBs in a descending order of the reception power of interference RS sequences transmitted in CSI-IM resources. The PCI information is an indicator indicating one of neighbor eNB groups predefined by the serving eNB, which may be reported to the serving eNB. In addition, the NAIC UE may report instantaneous INR values along with the PCI information to the serving eNB. The INR information may be useful when the serving eNB wants to intentionally control the level of interference introduced to the NAIC UE.

The afore-described information about the IC scheme may be transmitted to the serving eNB by a feedback container such as a PUSCH, or by a higher-layer signal.

Upon receipt of the NA signaling request or the information about the IC scheme from the NAIC UE, the serving eNB may request NA signaling to an interference eNB using the information about the IC scheme.

Requesting NA signaling to the interference eNB by the serving eNB will be described in greater detail.

According to an embodiment of the present invention, the serving eNB may request NA signaling only to a specific interference eNB that may later interfere with the NAIC UE serviced currently by the serving eNB using information (e.g., PCIs, INRs, etc.) of interference eNBs in each frequency resource region, as reported by the NAIC UE.

If the NAIC UE reports information about an interference eNB causing severe interference in each frequency resource region to the serving eNB, the serving eNB may predict an interference eNB that will interfere with the NAIC UE, as the serving eNB schedules the NAIC UE. Therefore, the serving eNB may control the level of interference that will occur to the NAIC UE. For example, in the presence of an INR period in which blind detection is performed well, the serving eNB may reschedule a frequency resource allocation based on information reported by the NAIC UE to achieve an interference level close to a corresponding INR. After the scheduling, the serving eNB may request NA signaling only to interference eNBs expected to cause interference to a corresponding resource region using the information about the interference eNBs.

According to another embodiment of the present invention, the serving eNB may define NACI capability information for UEs capable of performing NAIC from among UEs serviced by the serving eNB and may request NA signaling to an interference eNB based on information about the UEs having the NAIC capability.

In an LTE system according to an embodiment of the present invention, a UE may define the type of an IC scheme, the maximum number of interferences that can be cancelled, etc. as capability information about an operation that the UE may perform. For example, one or more NAIC capabilities may be defined according to a specific NAIC scheme (e.g., Enhanced-Linear Minimum Mean-Squared Error-Interference Rejection Combining (E-LMMSE-IRC), Codeword (CW)-level IC, Maximum Likelihood (ML), SLIC, etc.). Herein, the UE may transmit the capability information to a specific eNB and the capability information is maintained statically for the UE.

More specifically, the serving eNB may receive NAIC capability information from UEs serviced by the serving eNB and may determine an interference eNB to which NA signaling is to be requested based on the received NAIC capability information. For example, if only UEs having a NAIC capability based on E-LMMSE-IRC exist, the serving eNB may request DM-RS sequence information as one of NA signaling to an interference eNB. If only UEs having a NAIC capability supporting CW-IC exist, the serving eNB may request an interference eNB to transmit or provide DCI for interference data to the NAIC UEs.

According to another embodiment of the present invention, the serving eNB may define NAIC capabilities for UEs capable of performing NAIC among UEs serviced by the serving eNB and may transmit information about the number of UEs having a NAIC capability on a NAIC capability basis to an interference eNB.

On the assumption that a UE having a NAIC capability always performs NAIC, it may be preferable to determine transmission or non-transmission of NAIC signaling in consideration of the number of UEs supporting NAIC. That is, the serving eNB may transmit, to an interference eNB, information about the total number of UEs supporting NAIC from among the UEs serviced by the serving eNB, so that the interference eNB may determine whether to support NA signaling. Or the serving eNB may configure INR information based on UEs expected to produce a high IC effect among the UEs and transmit the INR information to tens of thousands of interference eNBs of the UEs. The serving eNB may calculate an INR based on information about an RSRP of a neighbor eNB measured and reported by a UE. When indicating the number of UEs supporting NAIC to an interference eNB, the serving eNB may indicate the number of UEs supporting NAIC on a NAIC capability basis, thus indicating the number of UEs currently performing NAIC on an IC scheme basis to the interference eNB.

According to another embodiment of the present invention, when the serving eNB receives NA signaling requests or information about IC schemes reported in an event-triggered manner from NAIC UEs, the serving eNB may request NA signaling to an interference eNB based on the NA signaling requests or the IC scheme information received from the NAIC UEs.

When the NAIC UEs transmit the NA signaling requests or the IC scheme information reported in an event-triggered manner to their serving eNB, the serving eNB may determine whether to request NA signaling to the interference eNB based on the collected information. For example, if a serving eNB $eNB_1$ requests NA signaling to a specific interference eNB $eNB_2$, $eNB_1$ may request the NA signaling to the interference eNB $eNB_2$ in consideration of resource efficiency, only when the number of UEs requesting NA signaling to $eNB_2$ is equal to or larger than N. Apparently, the serving eNB may request a specific NA signaling from among a plurality of NA signalings, when requesting NA signaling to the interference eNB. If the NA signaling is for semi-static coordination, the operation may support an operation for proposing coordination for NAIC to the interference eNB by the serving eNB of the NAIC UEs.

According to another embodiment of the present invention, when the serving eNB receives NA signaling requests or IC scheme information reported in an event-triggered manner from NAIC UEs, the serving eNB may indicate to each interference eNB the number of requests generated for the interference eNB on an IC scheme basis based on the NA signaling requests received from the NAIC UEs.

When the NAIC UEs transmit the NA signaling requests or the IC scheme information reported in an event-triggered manner, the interference eNB may determine whether to support NA signaling. For example, if the interference eNB supports dynamic signaling for NA signaling, the interference eNB supports the UEs performing the IC scheme of the neighbor eNB (i.e, the NAIC UEs) using its resources and thus is preferably responsible for determining whether to transmit the NA signaling. That is, only when the interference eNB has an extra capability to support NA signaling, the interference eNB may transmit the NA signaling selectively. The serving eNB may transmit, to the interference eNB, information about the number of NA signaling requests generated for the interference eNB on an IC scheme basis, as background information used for determining whether to transmit NA signaling.

According to another embodiment of the present invention, when the interference eNB receives an NA signaling request from the serving eNB of the NAIC UEs, the interference eNB may transmit information about a duration of NA signaling along with information indicating whether the NA signaling is supported to the serving eNB. When the serving eNB transmits NA signaling request information of the NAIC UEs to the interference eNB, the interference eNB may indicate that it supports or does not support a specific NA signaling to the serving eNB based on the NA signaling request information. The interference eNB may further transmit information about the duration of the NA signaling to the serving cell. Then the serving eNB may indicate that the NA signaling is supported and how long the NA signaling lasts to the UEs that are serviced by the serving eNB and perform the IC scheme.

Figure 6:
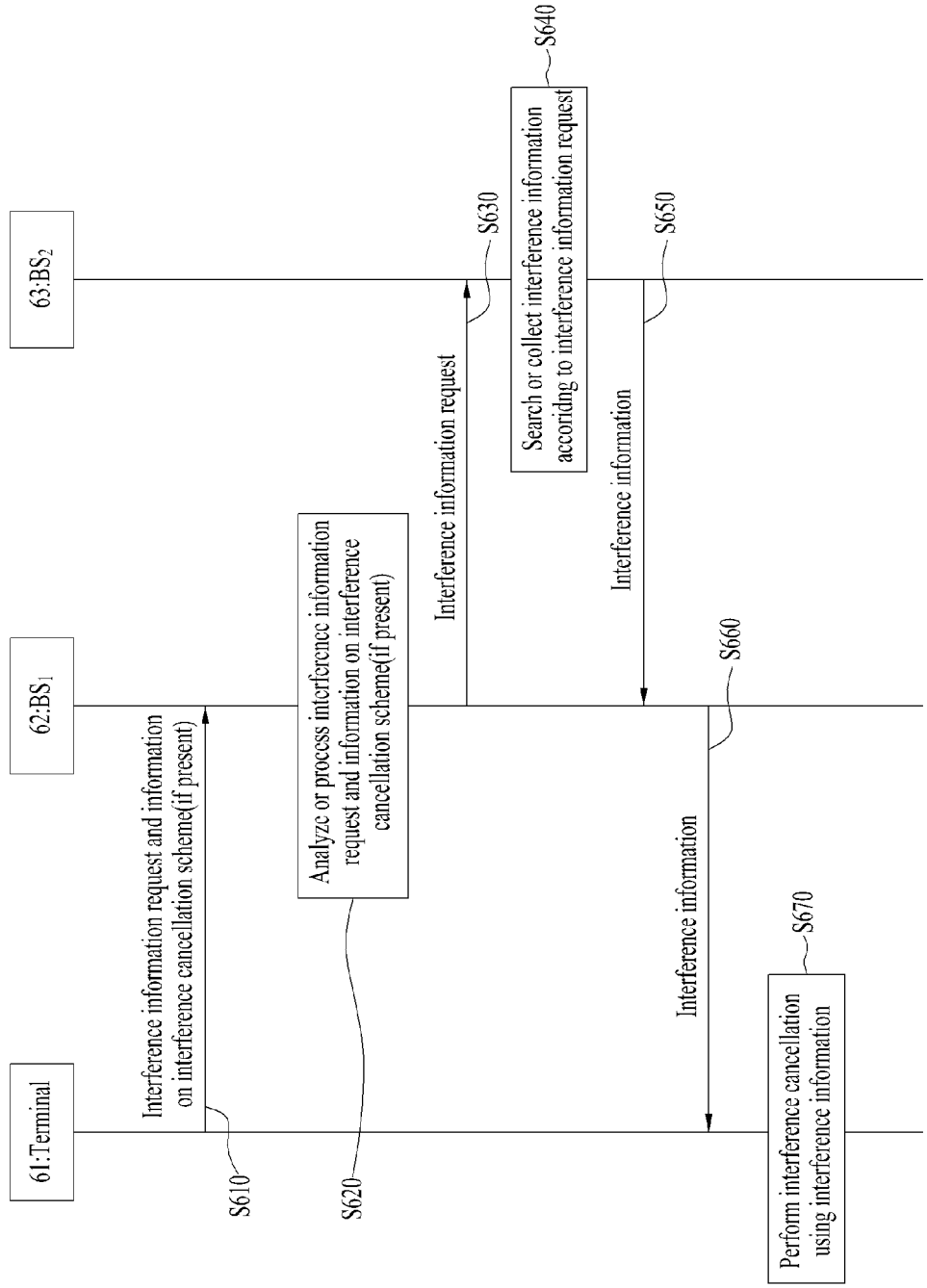
FIG. 6 illustrates a procedure for requesting interference information and cancelling interference using the interference information according to an embodiment of the present invention.

FIG. 6 illustrates a procedure for requesting interference information and cancelling interference using the interference information according to an embodiment of the present invention.

Referring to FIG. 6, it is assumed that a first BS (BS$_1$) 62 is a serving eNB for a terminal 61 and a second BS (BS$_2$) 63 is a neighbor eNB of BS$_1$ 62, which interferes with the terminal 61.

The terminal 61 may transmit an interference information request to BS$_1$ 62 (S610). When the terminal 61 wants to transmit the interference information request and an INR exceeds a threshold, the terminal 61 may transmit information about an IC scheme.

The interference information is information about the afore-described interference data. The terminal 61 may transmit the IC scheme information in addition to the interference information request. The IC scheme information may include information about the type of an IC scheme that the terminal 61 performs or IC target information indicating a target for the IC scheme. The IC target information may include IDs of one or more interference BSs to which the IC scheme is applied, information about frequency resource regions related to the IDs of the one or more interference BSs, INRs measured in the frequency resource regions, or information about the number of interference BSs to which the IC scheme is applied.

The ID of an interference BS may be acquired using an RS received in a specific frequency resource region of IM resources configured for the terminal 61. The RS has a sequence generated using PCI+N$_{(PCI,\ layer\ index)}$+n$_{PCI,s}$ as a seed value. The PCI is the ID of the interference BS, N$_{(PCI,\ layer\ index)}$ is a value preset according to the PCI and the layer index, and n$_{PCI,s}$ is a slot number or subframe number configured for the PCI.

BS$_1$ 62 may analyze or process the received interference information request and IC scheme information (only when the IC scheme information is received) (S620). BS$_1$ 62 may determine a specific interference BS to which the interference information request is to be transmitted according to the result of the analysis or the processing and may determine specific interference information to be requested to the interference BS and request the determined specific interference information to the interference BS (S630). In relation to FIG. 6, it is assumed that BS$_1$ 62 determines to transmit the interference information request to BS$_2$ 63. BS$_1$ 62 may determine required interference information according to the type of the IC scheme supported by the terminal 61 and may transmit a request for the determined interference information to BS$_2$ 63. Apparently, BS$_1$ 62 may transmit the interference information request to a BS indicated by the interference information request without any particular analysis or processing.

BS$_1$ 62 may control an interference level for the terminal 61 based on the IC scheme information received from the terminal 61. That is, if BS$_1$ 62 determines that the level of interference experienced by the terminal 61 exceeds a predetermined level, BS$_1$ 62 may decrease the interference level by reallocating frequency resources to the terminal 61. Herein, the information about the frequency resource regions related to the IDs of the one or more interference BSs may be used and BS$_1$ 62 may not allocate resources of the frequency resource regions to the terminal 61.

If the number of terminals transmitting interference information requests exceeds a threshold, BS$_1$ 62 may transmit the interference information request to BS$_2$ 63.

BS$_1$ 62 may transmit information about the number of received interference information requests for each of IC schemes supported by the terminals to BS$_2$ 63.

Upon receipt of the interference information request, BS$_2$ 63 may search for or collect interference information, that is, information about interference data that BS$_2$ 63 transmits using the interference information request and other information received from BS$_1$ 62 (S640).

BS$_2$ 63 may transmit the interference information to BS$_1$ 62 (S650). In addition, BS$_2$ 63 may transmit information about a duration of the interference information to BS$_1$ 62. BS$_2$ 63 may further transmit to BS$_1$ 62 information indicating whether BS$_2$ 63 will transmit the interference information in response to the interference information request.

BS$_1$ 62 may transmit the interference information received from BS$_2$ 63 to the terminal 61 (S660). Then the terminal 61 may perform IC using the interference information (S670).

While the proposed operation of the present invention has been described with reference to FIG. 6, it will be clearly understood to those skilled in the art that at least one of the afore-described embodiments is applicable to the operation related to FIG. 6.

Figure 7:
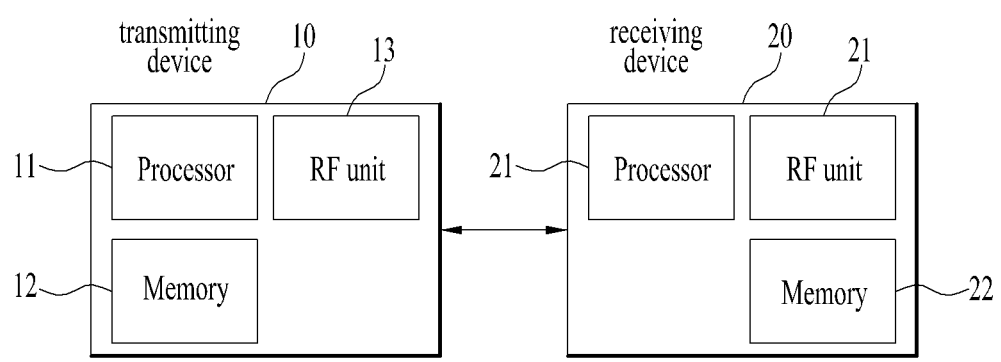
FIG. 7 is a block diagram of apparatuses for implementing an embodiment(s) of the present invention.

FIG. 7 is a block diagram of a transmitting device 10 and a receiving device 20 configured to implement exemplary embodiments of the present invention. Referring to FIG. 7, the transmitting device 10 and the receiving device 20 respectively include radio frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the RF unit 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under the control of the processor 21, the RF unit 23 of the receiving device 10 receives RF signals transmitted by the transmitting device 10. The RF unit 23 may include Nr receive antennas and frequency down-converts each signal received through receive antennas into a baseband signal. The RF unit 23 may include an oscillator for frequency down-conversion. The processor 21 decodes and demodulates the radio signals received through the receive antennas and restores data that the transmitting device 10 wishes to transmit.

The RF units 13 and 23 include one or more antennas. An antenna performs a function of transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An RF unit supporting a MIMO function of transmitting and receiving data using a plurality of antennas may be connected to two or more antennas.

In embodiments of the present invention, a UE serves as the transmission device 10 on uplink and as the receiving device 20 on downlink. In embodiments of the present invention, an eNB serves as the receiving device 20 on uplink and as the transmission device 10 on downlink.

The transmitting device and/or the receiving device may be configured as a combination of one or more embodiments of the present invention.

As is apparent from the foregoing description, an IC scheme can be performed efficiently using information for interference cancellation according to the embodiments of the present invention.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

The present invention may be used for a wireless communication apparatus such as a user equipment (UE), a relay and an eNB.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for performing interference cancellation, performed by a terminal in a wireless communication system, the method comprising:
   transmitting an interference information request and Interference Cancellation (IC) scheme information to a serving Base Station (BS);
   receiving, from the serving BS, interference information determined according to the interference information request and the IC scheme information; and
   performing interference cancellation using the interference information,
   wherein the IC scheme information is transmitted when the terminal is to transmit the interference information request and an Interference to Noise power Ratio (INR) exceeds a threshold.

2. The method according to claim 1, wherein the IC scheme information includes information about a type of an IC scheme performed by the terminal or IC target information indicating a target for the IC scheme.

3. The method according to claim 2, wherein the IC target information includes an Identifier (ID) of at least one interference BS being a target for the IC scheme, information about a frequency resource region associated with the ID of the at least one interference BS, an INR measured in the frequency resource region, information about the number of interference BSs being targets for the IC scheme, or traffic load detected in the frequency resource region.

4. The method according to claim 3, wherein the ID of the at least one interference BS is acquired using a reference signal received in a specific frequency resource region of interference measurement resources configured for the terminal.

5. The method according to claim 4, wherein the reference signal has a sequence generated using $PCI+N_{(PCI, layer index)}+n_{PCI,s}$ as a seed value, where PCI is the ID of the interference BS, $N_{(PCI, layer index)}$ is a value preset according to the PCI and the layer index, and $n_{PCI,s}$ indicates a slot or subframe number configured for the PCI.

6. The method according to claim 1, further comprising receiving information about a duration of the interference information from the serving BS.

7. A method for performing interference cancellation, performed by a Base Station (BS) in a wireless communication system, the method comprising:
   receiving an interference information request and Interference Cancellation (IC) scheme information from at least one served terminal;
   transmitting the interference information request to at least one interference BS based on the IC scheme information;
   receiving interference information from the at least one interference BS; and
   transmitting the interference information to the at least one served terminal,
   wherein the IC scheme information is received when the at least one served terminal is to transmit the interference information request and an Interference to Noise power Ratio (INR) exceeds a threshold.

8. The method according to claim 7, wherein the at least one interference BS is a BS that interferes with the at least one served terminal, determined using the IC scheme information from among neighbor BSs of the BS.

9. The method according to claim 7, further comprising reallocating frequency resources for the at least one served terminal to adjust an interference level of the at least one served terminal based on the IC scheme information received from the at least one served terminal.

10. The method according to claim 7, wherein the transmission of the interference information request comprises determining interference information required according to a type of an IC scheme supported by the at least one served terminal and transmitting a request for the determined interference information to the at least one interference BS.

11. The method according to claim 7, wherein the transmission of the interference information request comprises, if the number of served terminals having transmitted the interference information request for a specific interference BS exceeds a threshold, transmitting the interference information request to the specific interference BS.

12. The method according to claim 7, further comprising transmitting to the at least one interference BS information about the number of interference information requests received by the BS, for each type of IC schemes supported by the at least one served terminal.

13. The method according to claim 7, wherein the IC scheme information includes information about a type of an IC scheme performed by the at least one terminal or IC target information indicating a target for the IC scheme.

14. The method according to claim 13, wherein the IC target information includes an Identifier (ID) of at least one interference BS being a target for the IC scheme, information about a frequency resource region associated with the ID of the at least one interference BS, an INR measured in the frequency resource region, information about the number of interference BSs being targets for the IC scheme, or traffic load detected in the frequency resource region.

15. The method according to claim 14, wherein the ID of the at least one interference BS is acquired using a reference signal received in a specific frequency resource region of interference measurement resources configured for the at least one terminal.

16. The method according to claim 15, wherein the reference signal has a sequence generated using $PCI + N_{(PCI, layer\ index)} + n_{PCI,s}$ as a seed value, where PCI is the ID of the interference BS, $N_{(PCI, layer\ index)}$ is a value preset according to the PCI and the layer index, and $n_{PCI,s}$ indicates a slot or subframe number configured for the PCI.

17. The method according to claim 7, further comprising receiving information about a duration of the interference information from the at least one interference BS.

18. The method according to claim 7, further comprising receiving, from the at least one interference BS, information indicating whether the interference BS provides the interference information.

19. A terminal configured to perform interference cancellation in a wireless communication system, the terminal comprising:
a Radio Frequency (RF) unit; and
a processor configured to control the RF unit,
wherein the processor is configured to transmit an interference information request and Interference Cancellation (IC) scheme information to a serving Base Station (BS);
receive, from the serving BS, interference information determined according to the interference information request and the IC scheme information; and
perform interference cancellation using the interference information,
wherein the IC scheme information is transmitted when the terminal is to transmit the interference information request and an Interference to Noise power Ratio (INR) exceeds a threshold.

20. A base station (BS) configured to perform interference cancellation in a wireless communication system, the BS comprising:
a Radio Frequency (RF) unit; and
a processor configured to control the RF unit,
wherein the processor is configured to receive an interference information request and Interference Cancellation (IC) scheme information from at least one served terminal;
transmit the interference information request to at least one interference BS based on the IC scheme information;
receive interference information from the at least one interference BS; and
transmit the interference information to the at least one served terminal,
wherein the IC scheme information is received when the at least one served terminal is to transmit the interference information request and an Interference to Noise power Ratio (INR) exceeds a threshold.

* * * * *